US 8,051,136 B2

(12) United States Patent
Dingler et al.

(10) Patent No.: US 8,051,136 B2
(45) Date of Patent: Nov. 1, 2011

(54) OPTIMIZING A PRESENCE ENABLED MANAGED SERVICE

(75) Inventors: John R. Dingler, Dallas, GA (US); Michael Gilfix, Austin, TX (US); Pramodh D. Narayan, Naperville, IL (US); Sri Ramanathan, Lutz, FL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 12/250,131

(22) Filed: Oct. 13, 2008

(65) Prior Publication Data
US 2010/0094984 A1 Apr. 15, 2010

(51) Int. Cl.
*G06F 15/16* (2006.01)
(52) U.S. Cl. ........ 709/206; 709/207; 709/227; 709/228; 709/229
(58) Field of Classification Search .......... 709/206, 709/207, 227–229
See application file for complete search history.

(56) References Cited

U.S. PATENT DOCUMENTS

| | | | | |
|---|---|---|---|---|
| 7,106,756 B1 * | 9/2006 | Donovan et al. | ............ | 370/468 |
| 7,284,058 B1 * | 10/2007 | Synnestvedt et al. | ......... | 709/227 |
| 7,379,461 B2 * | 5/2008 | Wu et al. | .................... | 370/395.2 |
| 7,522,581 B2 * | 4/2009 | Acharya et al. | ............... | 370/352 |
| 7,616,746 B2 * | 11/2009 | O'Neill | ..................... | 379/114.01 |
| 7,817,665 B2 * | 10/2010 | Khan | ............................. | 370/467 |
| 2002/0112073 A1 * | 8/2002 | MeLampy et al. | ............ | 709/240 |
| 2002/0114282 A1 * | 8/2002 | MeLampy et al. | ............ | 370/238 |
| 2003/0037103 A1 * | 2/2003 | Salmi et al. | .................... | 709/203 |
| 2003/0046581 A1 * | 3/2003 | Call et al. | ....................... | 713/201 |
| 2003/0133457 A1 * | 7/2003 | Ono et al. | .................. | 370/395.4 |
| 2003/0152028 A1 * | 8/2003 | Raisanen et al. | ............. | 370/235 |
| 2003/0227894 A1 * | 12/2003 | Wang et al. | .................... | 370/338 |
| 2004/0015569 A1 | 1/2004 | Lonnfors et al. | | |
| 2004/0117794 A1 * | 6/2004 | Kundu | ......................... | 718/102 |
| 2004/0128346 A1 * | 7/2004 | Melamed et al. | ............. | 709/203 |
| 2005/0238026 A1 * | 10/2005 | Wu et al. | ..................... | 370/395.2 |
| 2006/0098577 A1 * | 5/2006 | MeLampy et al. | ............ | 370/238 |
| 2006/0123082 A1 * | 6/2006 | Digate et al. | .................. | 709/205 |
| 2006/0195532 A1 | 8/2006 | Zlateff et al. | | |
| 2006/0215633 A1 * | 9/2006 | Jennings et al. | ............. | 370/352 |

(Continued)

FOREIGN PATENT DOCUMENTS
WO 2007037679 A1 4/2007

*Primary Examiner* — Hieu Hoang
(74) *Attorney, Agent, or Firm* — Patrick J. Daugherty; Driggs, Hogg, Daugherty & Del Zoppo Co., LPA

(57) ABSTRACT

Methods, systems, processes and devices are provided for optimizing throughput and quality of service of a presence enabled managed service. The method includes at least a first entity requesting from an aggregator of presence services presence information of a second entity. The method includes looking up a profile of the aggregator stored in a cache of a presence server hosted by the presence enabled managed service. The method includes determining from the profile an aggregator level of service the aggregator has subscribed to from the presence enabled managed service, wherein the aggregator level of service is one of high level service, medium level service, and low level service. The method includes storing presence information of the second entity on a presence document on the cache and returning the presence information to the first entity based upon the aggregator level of service.

20 Claims, 3 Drawing Sheets

U.S. PATENT DOCUMENTS

| | | | |
|---|---|---|---|
| 2006/0286993 A1* | 12/2006 | Xie et al. | 455/518 |
| 2007/0189487 A1 | 8/2007 | Sharland et al. | |
| 2007/0206620 A1* | 9/2007 | Cortes et al. | 370/412 |
| 2007/0253340 A1* | 11/2007 | Varney et al. | 370/252 |
| 2007/0274505 A1* | 11/2007 | Gupta et al. | 379/265.01 |
| 2007/0288630 A1* | 12/2007 | De Noia et al. | 709/224 |
| 2008/0027996 A1 | 1/2008 | Morris | |
| 2008/0034040 A1 | 2/2008 | Wherry et al. | |
| 2008/0059552 A1 | 3/2008 | Blohm | |
| 2009/0006626 A1* | 1/2009 | Yamagishi | 709/226 |
| 2009/0037548 A1* | 2/2009 | Ordille et al. | 709/206 |

* cited by examiner

OPTIMIZING A PRESENCE ENABLED MANAGED SERVICE

FIELD OF THE INVENTION

The present invention generally describes methods, processes, systems and devices for optimizing quality of service, reducing latency, and improving throughput of presence related requests in an IP multimedia subsystem based telecommunications network.

BACKGROUND OF THE INVENTION

Presence enabled managed services are known in the art. Presence enabled managed services enable presence information of a presentity to be provided to a presence requester. The presence information denotes the presentity's ability and availability to communicate with the presence requestor. Presence information is represented as an extensible markup language document (XML) called a presence document that is a record of the presence associated with the presentity at a given point in time. This presence document is stored in a presence server, such as an IP Multimedia Subsystem (IMS) compliant Session Initiation Protocol (SIP) application server. IMS is an architectural framework for delivering internet protocol (IP) multimedia to mobile users. The (SIP) is a signalling protocol, widely used for setting up and tearing down multimedia communication sessions such as voice and video calls over the Internet.

However, there remains a number of deployment complexities with respect to the actual deployment of a presence server in a telecommunications network. First, most telecommunications carriers have very few IMS subscribers with IMS compliant handsets.

Second, presence information in a typical network will require the collection of presence information from an IMS core and a number of other legacy non-IMS network components. These non-IMS network components include location platforms, the Home Location Register (HLR) infrastructure, the legacy data network, which includes over the air interfaces such as GPRS, 1XRtt, EVDO, Wifi networks and others, and other legacy instant messaging platforms that are not SIP compliant, such as an external IM gateway.

Third, the obtaining of presence information is complicated by several factors. In the absence of a custom interface written for these legacy sources, a pull based model may be required to collect presence information from these sources. A pull based model may be very expensive in terms of network resource consumed and sometimes is of very high latency. For example, a location request (which could be one of the nodes of the presence document) could take over 10-12 seconds in most wireless networks, making it very difficult to incorporate this element of presence efficiently.

To leverage presence services to build higher level composite services, a set of immediate aggregators and independent software vendors (ISV's) outside the carrier domain will probably be a big consumer of basic presence services from the telecommunications service provider. As such, a more logical implementation interface for these external requests are paradigms such as web services rather than SIP based signaling. This is because exposing SIP outside the services provider domain has a number of issues associated with it.

Notifications to presence requesters who have subscribed to presence information may follow established web services based mechanisms such as Parlay X 2.0 and Parlay X 2.1 or protocols such as REST (Representational State Transfer).

SUMMARY OF THE INVENTION

Methods, systems, processes and devices are provided for optimizing throughput and quality of service of a presence enabled managed service. In an embodiment of the invention, the method comprises: 1) at least a first entity requesting from an aggregator of presence services presence information of a second entity; 2) looking up a profile of the aggregator stored in a cache of a presence server hosted by the presence enabled managed service; 3) determining from the profile an aggregator level of service the aggregator has subscribed to from the presence enabled managed service, wherein the aggregator level of service is one of high level service, medium level service, and low level service; and 4) storing the presence information of the second entity on a presence document on the cache and returning the presence information to the first entity based upon the aggregator level of service.

In another embodiment of the invention, there is provided a method of deploying an application enabling optimizing throughput and quality of service of a presence enabled managed service. The method comprises providing a computational device infrastructure configured to: 1) enable a first entity to request from an aggregator of presence services presence information of a second entity; 2) look up a profile of the aggregator stored in a cache of a presence server hosted by the presence enabled managed service; 3) determine from the profile an aggregator level of service the aggregator has subscribed to from the presence enabled managed service, wherein the aggregator level of service is one of high level service, medium level service, and low level service; and 4) store the presence information of the second entity on a presence document on the cache and return the presence information to the first entity based upon the aggregator level of service.

In another embodiment of the invention, there is provided a method of optimizing throughput and quality of service of a presence enabled managed service. The method comprises: 1) producing computer executable program code; 2) storing the code on a computer readable medium; 3) providing the program code to be deployed and executed on a computer system, the program code causing the computer system to: a) enable a first entity to request from an aggregator of presence services presence information of a second entity; b) look up a profile of the aggregator stored in a cache of a presence server hosted by the presence enabled managed service; c) determine from the profile an aggregator level of service the aggregator has subscribed to from the presence enabled managed service, wherein the aggregator level of service is one of high level service, medium level service, and low level service; and d) store the presence information of the second entity on a presence document on the cache and return the presence information to the first entity based upon the aggregator level of service.

In another embodiment of the invention, there is provided a programmable device. The device comprises: 1) a processing means; 2) a memory in communication with the processing means comprising an instruction logic parser logic component; 3) a network interface in communication with the processing means and the memory; wherein the processing means is configured to: a) parse a request from a first entity requesting from an aggregator of presence services presence information of a second entity; b) look up a profile of the aggregator stored in a cache of a presence server hosted by the presence enabled managed service; c) determine from the profile an aggregator level of service the aggregator has subscribed to from the presence enabled managed service, wherein the aggregator level of service is one of high level service, medium level service, and low level service; and d) store the presence information of the second entity on a presence document on the cache and return the presence information to the first entity based upon the aggregator level of service.

BRIEF DESCRIPTION OF THE DRAWINGS

These and other features of the methods, systems and devices and program products for optimizing quality of service, reducing latency, and improving throughput of presence related requests in an IP multimedia subsystem based telecommunications network will be more readily understood from the following detailed description of the various aspects of the embodiments taken in conjunction with the accompanying drawings in which.

Figure 1:
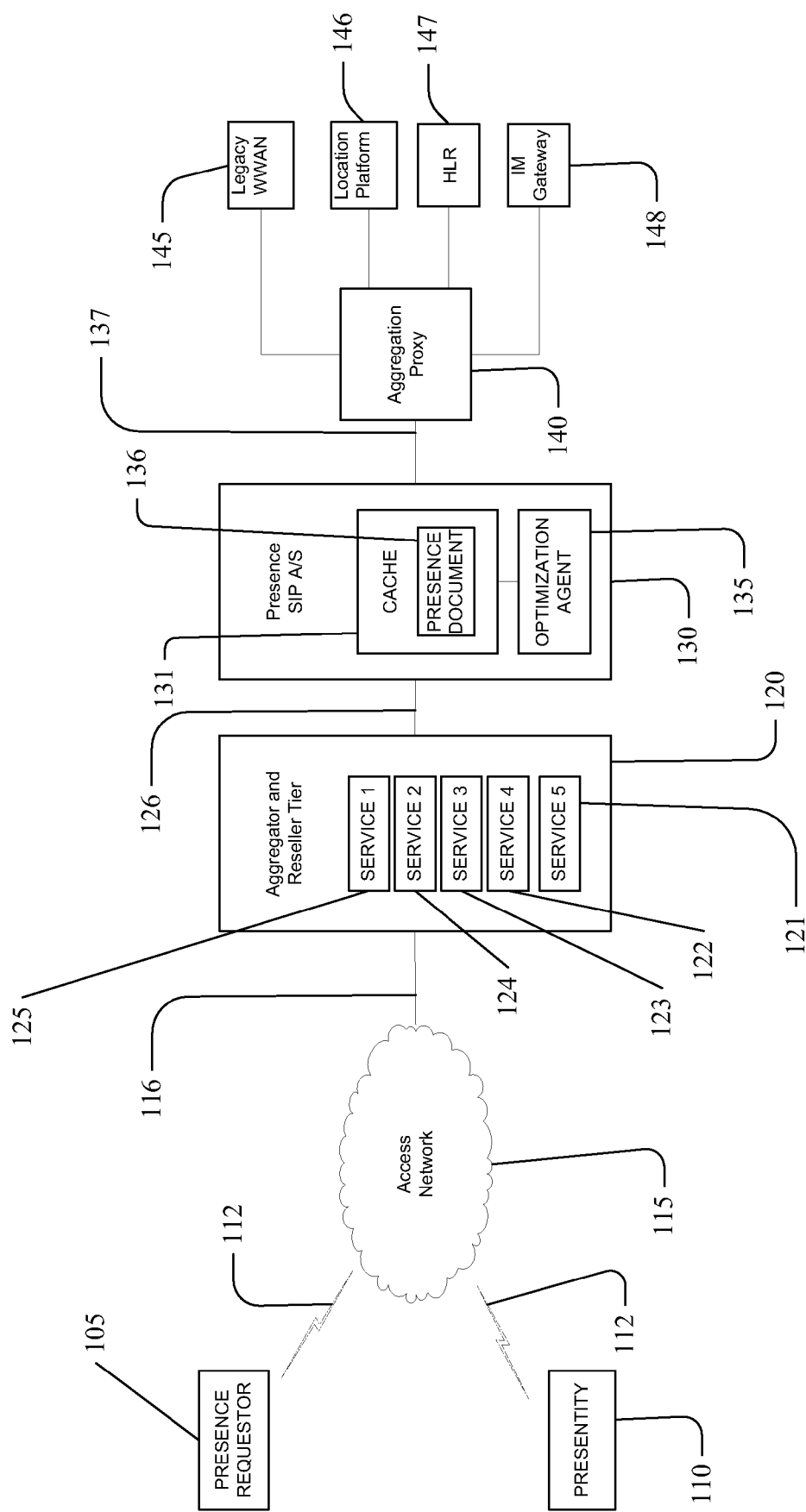
FIG. 1 is block diagram of an embodiment of an architecture for optimizing quality of service, reducing latency, and improving throughput of presence related requests in an IP multimedia subsystem based telecommunications network.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience the Detailed Description of the Invention has the following sections:
 I. General Description; and
 II. Computerized Implementation.

I. General Description

The present application discloses systems, methods, devices and program products for managing and optimizing presence related requests to at least one aggregator or subscriber of presence enabled managed services. In an embodiment of the invention, the provider of the presence enabled services (hereinafter "presence service") is typically a telecommunication service hosting a telecommunication network for hosting telecommunications such as cellular telephone service or other voice and data communications. In an embodiment, the telecommunication service hosts a presence server for storing presence information about one or more presentities connected directly or indirectly to the telecommunication service. For example, the presence service may store presence information about presentities including whether a presentity is currently connected to the telecommunications service and available for communicating with the presence requestor.

In another embodiment of the invention, the presence information is stored on a presence server that is hosted by an entity that is external to the telecommunications service. Presence information about a presentity that is requested from a presence requester connected to the telecommunications network is retrieved from the presence server of the entity through the telecommunications network. The presentity may be connected directly to the telecommunications service or it may be connected to the presence service through another communications or computer network. Alternately, the presence requester may be indirectly connected to the telecommunications service through another communications network and be requesting presence information about a presentity connected directly to the telecommunications service.

The at least one aggregator may be a subscription based service (such as GOOGLE™, YAHOO™, MSN™ and AOL IM™) or other service wherein the presence requester and/or the presentity may subscribe and log in to the service through the telecommunications network or other computer network connected to the telecommunications network. (GOGGLE is a trademark of Google, Inc. in the United States or other countries; YAHOO is a trademark of Yahoo, Inc. in the United States or other countries; MSN is a trademark of the Microsoft Corporation in the United States or other countries; and AOL IM is a trademark of AOL, Inc. in the United States or other countries.) For example, a presence requestor may log onto a subscription based service on a computer network through a remote computer and request presence information about a presentity that is connected directly to the telecommunications service through a remote device such as a cellular telephone or other mobile wireless device having a unique identifier such as a mobile device number (MDN). Once the presence information is received, the presence requester may initiate communication with the presentity, if available, using a medium such as instant messaging service using the SIP protocol or other messaging/communication services (such as SMS text messaging, VOIP, data over IP and cellular telephones).

Alternately, a presence requester connected directly to the telecommunications service through a device such as a cellular telephone or other mobile device may request presence information about a presentity connected to a computer network connected to the telecommunications service through a remote computer. It should be understood that there may be multiple aggregators (alternately referred to as subscribers) that partner with and have a service level agreement (SLA) with the presence service for providing presence requesters with presence information for presentities connected thereto. Thus, a presence requester that subscribes to one aggregator connected to the presence service may request presence information of a presentity that is a subscriber of another aggregator also connected to the presence server.

The presence information that may be provided to a presence requester about a presentity includes the presentities availability to communicate with the presence requestor, e.g., including, but not limited to, whether the presentity is on-line, will accept all communications or only communications of a particular type (voice, text, data, protocol) or from specified presence requestors, the channel for communicating with, the presentity is busy and wishes to not be disturbed, is currently on a cellular phone voice or data session, is in a particular location or out of a particular location, the last time the presentity was logged on, what activities the presentity may be doing, or other information the presentity may wish the presence requestor to have.

The presence information of the presentity is stored on a presence document on the presence server. The presence document may be an XML document or a representational state transfer "REST" based resource document which allows for the document to be stored and transmitted via a standardized interface (e.g., HTTP) and exchange representations of these resources. The use of the REST based resource presence document provides improved response time and reduced server load due to its support for the caching of representations of the presence document which is discussed in more detail below. In addition, the use of the REST based resource for the presence document allows the presence request to be also of the REST based resource protocol providing for improved response time and reduced server load.

In another embodiment of the invention, the aggregator may include in the SLA an agreement to provide other information to the presentities or presence requestors when they log onto the telecommunications service or computer network connected to the telecommunications service. For example, when a particular presentity or presence requestor connects to the telecommunications service or computer network, the aggregator may provide information such as the weather, traffic information or other information relevant to the location of the presentity or presence requester.

In an embodiment of the invention, the systems, methods, devices and program products uses a specialized caching algorithm for managing presence data so that it is more efficiently provided to presence requestors while reducing latency and increasing overall platform throughput via a caching mechanism. Particularly, the present application discloses systems, methods, devices and program products that allow subscribers to request presence information on an as needed basis, and also optimize the way it is reused for their own needs. With the use of lazy caching or predictive caching, the subscriber is able to determine if subcomponents of the presence information is likely to be called by the presence requestor. The subscriber has the ability to inform the system what items of presence information that may need to be placed in cache that are subcomponents of the presence request. The presence service uses an algorithm for combining quality of service (QOS) specified in the SLA between the subscriber and the presence service. The SLA also provides for the subscriber signing up for a level of throughput $Q'$ and a trigger level $\mu$ that proactively starts asynchronous presence requests under special conditions. The presence service hosts a computer system known as a presence server that uses an optimization agent to determine which items should be cached based off of a subscriber's priority and probability that a subset of a presence document will be required by the presence requester. This aids in determining what subsets of a document should or should not be cached for use by the user.

The optimization mechanism may also use (REST) based abstraction for presence documents that goes back on the intial request to retrieve a base presence document, but is effectively able to evaluate if subsets of the base document are sufficient for future subsequent presence requests made by the presence requester.

Referring now to FIG. 1, shown is block diagram of an embodiment of an architecture of systems, methods, devices and program products for optimizing quality of service, reducing latency, and improving throughput of presence related requests in an IP multimedia subsystem based telecommunications network. At least one presence requester 105 is connected to an access network 115 through a communications link 112 which may be a telecommunications service or other communications network. Communications link 112 may be a wireless communications connection or other communications connection. The presence requester 105 may connect to the access network 115 with a mobile device such as a wireless mobile device or other communications device. For example, the mobile device may be a cellular telephone or wireless personal computing device or a remote computer. The mobile device may include a mobile device number (MDN) or other unique identifier.

The access network 115 is connected via communications link 116 to one or more aggregators 121, 122, 123, 124, 125 of presence based managed services on a subscription basis as defined in the SLA, and collectively shown in FIG. 1 in the Aggregator and Reseller Tier 120. Thus, the presence requester 105 is connected to one or more of the aggregators 121, 122, 123, 124, 125 through the access network 115. Alternately, the presence requester 105 may be connected to one or more aggregators 121, 122, 123, 124, 125 through another communications network.

At least one presentity 110 is connected to the access network 115 through a communications link 112 which may be a telecommunications service or other communications network. Communications link 112 may be a wireless communications connection or other communications connection. The presentity 110 may connect to the access network 115 with the mobile device such as the wireless mobile device or other communications device. For example, the mobile device may be a cellular telephone or wireless personal computing device or a remote computer. Thus, the presence requestor 105 is connected to one or more of the aggregators 121, 122, 123, 124, 125 through the access network 115. Alternately, the presentity 110 may be connected to one or more aggregators 121, 122, 123, 124, 125 through another communications network.

The access network 115 may be a telecommunications service which provides the presence enabled managed services to the one or more of the aggregators 121, 122, 123, 124, 125. If the access network 115 provides the presence enabled managed services to the one or more of the aggregators 121, 122, 123, 124, 125, then the access network 115 will host a presence server using the SIP signalling protocol, such as the Presence SIP Application Server 130 shown in FIG. 1. Alternately, the presence service could be another entity outside of the telecommunication service domain that hosts a presence server such as the Presence SIP Application Server 130. In this case, aggregators 121, 122, 123, 124, 125 are connected to the presence server 130 via communications link 126. The presence server 130 collects and stores presence information for presentities 110 that subscribe to one of the aggregators 121, 122, 123, 124, 125. Thus, a presence requestor 105 that subscribes to one of the aggregators 121, 122, 123, 124, 125 may request presence information stored on the presence server 130 of a presentity 110 that subscribes to one of the aggregators 121, 122, 123, 124, 125.

The presence server 130 includes an optimization agent 135 that uses a specialized caching algorithm for managing presence data so that it more efficiently provided to presence requesters 105 while reducing latency and increasing overall platform throughput via a caching mechanism. The optimization agent 135 determines what items should be cached on the presence server 130 based on the aggregator's 121, 122, 123, 124, 125 priority and probability that a subset of a presence document 136 will be required by the subscriber. This determines what subsets of a presence document 136 should or should not be cached for use by the aggregators 121, 122, 123, 124, 125 according to the SLA between the presence service and the particular aggregator.

The optimization agent 135 uses three dimensions for optimization. The dimensions are aggregator priority $T'$, throughput $Q'$ that the aggregator has signed up for, and a proactive caching mechanism or trigger $\mu$. The threshold priority $T'$ value for each aggregator is tiered in categories. For example, the aggregator may be a high value subscriber where $T'$ is a time x in seconds that is the maximum amount of time that presence information for presentities may remain in cache 131 on the presence server 130. The aggregator may be a medium value subscriber where T' is a time y in seconds that is the maximum amount of time that presence information for presentities may remain in the cache 131. The aggregator may be a low value subscriber where a time T' is a time z in seconds that is the maximum amount of time that presence information for presentities may remain in the cache 131.

The throughput Q' is the threshold throughput value in transactions per second (TPS) that the aggregator has signed up for. The throughput Q' value is the maximum number of presence requests that an aggregator can present to the presence service in one second. For example, for a high value subscriber the throughput may be Q'x=100 TPS. The throughput Q' for a medium value subscriber may be Q'y=50 TPS. The throughput Q' for a low value subscriber may be Q'z=25 TPS.

The third dimension is a threshold trigger μ value that proactively starts making asynchronous presence requests under special conditions. The special condition may be an amount of time that has elapsed since the last presence request a presence requestor 105 made of a presentity's presence information. For example, for a high value subscriber the trigger μ may be μx=0.1x, where x is a predetermined time value, e.g., one second. Thus, for a high value subscriber, the presence server 130 may automatically update the presence information in cache 131 every tenth of a second for presentities 110 currently connected to the presence service. This means that the presence service makes a high effort to provide updated presence information to the presence requester 105 rather than relying on presence information that was collected at an earlier time, thereby highly improving quality of service and reducing latency.

The trigger μ value for a medium value subscriber may be μy=0.2y where y is a predetermined time value, e.g., one second. Thus, for a medium value subscriber, the presence server 130 may automatically update the presence information in cache 131 every two-tenths of a second for presentities 110 currently connected to the presence service. This means that the presence service makes a moderate effort to provide updated presence information to the presence requester 105 rather than relying on presence information that was collected at an earlier time, thereby moderately improving quality of service and reducing latency.

The trigger μ value for a low value subscriber may be μz=0.3z where y is a predetermined time value, e.g., one second. Thus, for a low value subscriber, the presence server 130 automatically updates the presence information in cache 131 every three-tenths of a second for presentities 110 currently connected to the presence service. This means that the presence service makes only a slight effort to provide updated presence information to the presence requester 110 rather than relying on presence information that was collected at an earlier time, thereby only slightly improving quality of service and reducing latency.

The use of the trigger μ is particularly useful for optimizing quality of service and reducing latency when using the REST based resource for a presence document 136 since once a presence document 136 received as a result of the initial presence request is stored on the presence server 130, only the portions of the presence document 136 that have changed need to be updated. For example, if the initial presence document 136 contained presence information such as the location, method of communicating, and the presentity's availability for communicating, and only the presentity's location changed between presence requests, the presence document 136 need only be updated with the presentity's current location. Thus, each time the trigger μ updates the presence document 136 in cache 131 according to the subscriber's usage level, only the presence information that has changed since the last request need be updated in cache 131.

In another embodiment of the invention, the presence server 130 may be connected via a communication link 137 to an aggregation proxy server 140 which is connected to one or more sources that may collect presence information about one or more presentities 110 connected to legacy sources such as a legacy WWAN 145, location platform 146, the home location infrastructure (HLR) 147 and other instant messaging legacy platforms that are not SIP compliant, such as an external IM gateway 148. The aggregation proxy server 140 therefore would require software from independent service vendors (ISV'S) for pulling the presence information from these sources when requested.

Figure 2:
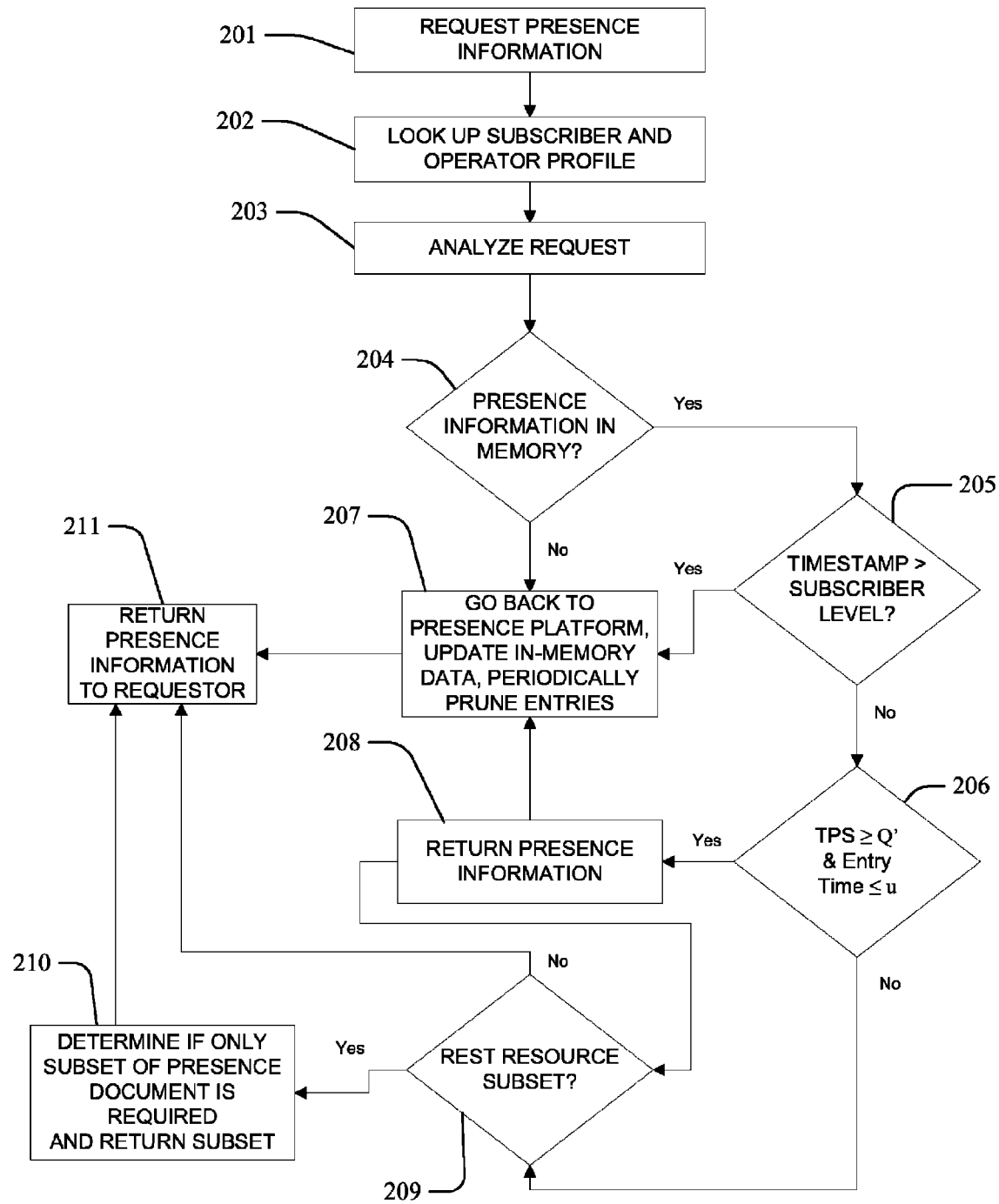
FIG. 2 is a flow diagram of a method for optimizing quality of service, reducing latency, and improving throughput of presence related requests in an IP multimedia subsystem based telecommunications network.

Referring now particularly to FIG. 2 and to FIG. 1, shown is a flow diagram illustrating an embodiment of a method or process using the optimization agent 135 to determine what content of the presence document 136 should be cached based off the aggregator's priority and probability that a subset of a presence document 136 will be required by the subscriber. The method begins in 201 wherein a presence requestor 105 who is a subscriber of one of the aggregators 121, 122, 123, 124, 125 requests presence information of a presentity 110 who is a subscriber of one of the aggregators 121, 122, 123, 124, 125 or the legacy platforms 145, 146, 147, 148. The presence request is submitted to the presence server 130 hosted by the access network 115 or other computer network. In 202, the optimizing agent 135 performs a lookup of the profile associated with the aggregator 121, 122, 123, 124, 125 the presentity has subscribed to and determines the level of service the aggregator has subscribed to including priority, throughput Q' and proactive trigger μ. In 203, the presence request is analyzed. The method continues in step 204 where the optimization agent 135 determines if presence information for the associated mobile device number (MDN) of the presentity is in cache 131. If it is not, in 207 a query is sent to the presentity 110, and the resulting presence information is added to the presence document 136 in the cache 131 along with a timestamp. In 211, the presence information is then returned to the presence requester 105.

In 205, it is determined if the presence information for the MDN is in the cache 131, but it has been in the cache 131 for longer than the subscriber priority T', a query is sent to the presentity 110, followed by an update of the presence information (including timestamp) in the cache 131. In 211, the updated presence information is then returned to the presence requester 105.

In 206, it is determined if the presence information for the MDN is in the cache 131 and the Q' value is equal to or exceeds the threshold for the subscriber level, and the time for which the presence information has been in the cache 131 is equal to or less than the trigger μ, then return presence information in the cache 131, but proactively send a presence request to the presentity 110 and update the cache 131 with the updated presence information and timestamp. If the presence information for the MDN is in the cache 131, and the rate of query for the MDN is less than Q' for the category of the subscriber and the time value of the trigger μ the presence information has been there is less than the time value of the trigger μ associated with the category, then in 208 the presence information in the cache 131 is returned to the presence requester 105.

In 209, the presence information returned in 208 is evaluated to determine if it is a REST based resource presence document and what parts of the presence document is germane to the presence request. If it is not a REST based resource document, in 211 the presence information is returned to the presence requester 105. If the presence document is a REST resource presence document, in 210 it is determined if only a subset of the presence document 136 is required to send the current presence information. If only a subset of the presence document is necessary, in 211 the subset of the presence document 136 is returned to the presence requester 105. In 210, if the whole presence document is required, the whole presence document 136 is returned to the presence requester 105 in 211.

The presence requester 105 may send additional attributes in the presence request that assist the optimization agent 135 in determining what subsets of the presence document 136 may be required. This allows the optimization agent 135 to be overridden by the presence requester 105 if the presence requester 105 has permission to override the optimization agent's algorithm. This gives full control to the presence requester 105 to free cache 131 subsets of the presence document 136 that the optimization agent 135 may not have cached. This override prevents the burning of data that may be used in the near future. In addition, in step 207 the optimization agent 135 may periodically prune presence documents 136 that remain in cache longer than the maximum allowable time which is the time T' of the highest subscriber category.

II. Computerized Implementation

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java®, Smalltalk®, C++ or the like and conventional procedural programming languages, such as the "C" programming language or similar programming languages. (JAVA is a trademark of Oracle in the United States or other countries; SMALLTALK is a trademark of Instantiations, Inc. in the United States or other countries.) The program code may execute entirely on the user's computer, partly on the user's computer, as a stand-alone software package, partly on the user's computer and partly on a remote computer or entirely on the remote computer or server. Thus, embodiments of the present invention comprise methods, apparatus (e.g. systems, devices, etc.) and computer program products. For example, it will be understood that each block of the flowchart illustrations and/or block diagrams of the figures, including FIGS. 1 and 2 as described above, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
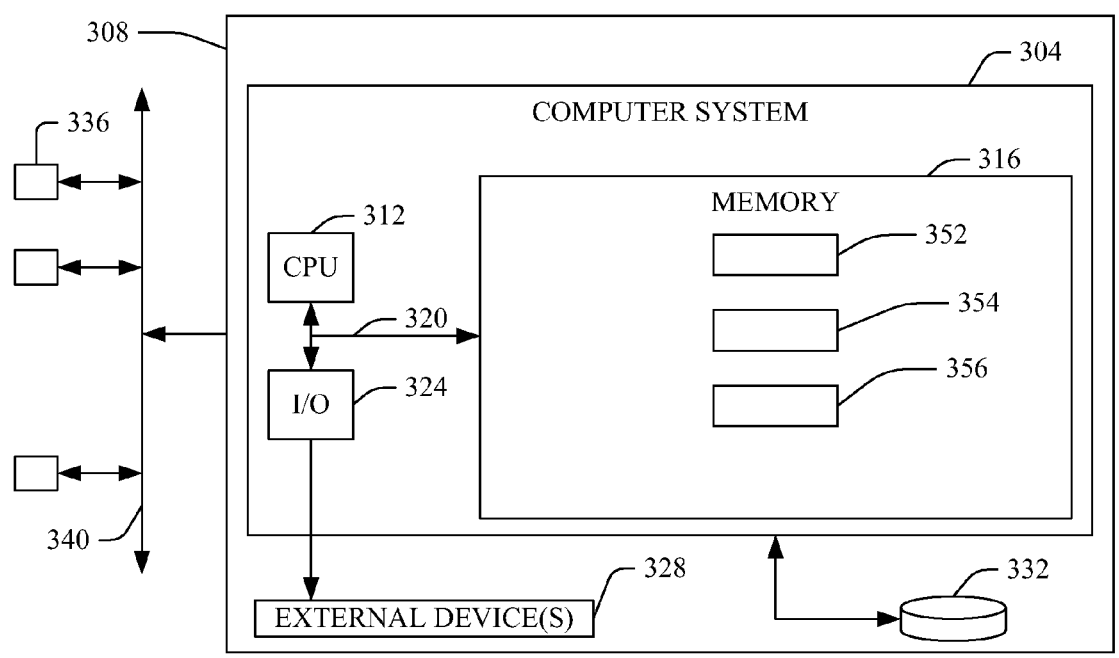
FIG. 3 is a block diagram illustrating a computerized device implementation configured to perform the method of FIG. 2.

Referring now to FIGS. 1-3, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 3, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and system for optimizing quality of service, reducing latency, and improving throughput of presence related requests in an IP multimedia subsystem based telecommunications network in FIGS. 1-2 and described above, for example including optimization agent 135, cache 131, and presence document 136 components discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The memory 316 may include registers such as registers 352, 354 and 356 where such data is written and/or read. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

Still yet, computer infrastructure 308 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention for one or more customers, and in return the service provider can receive payment from the customer(s) under a subscription and/or fee agreement and/or the service provider can receive payment from the sale of advertising content to one or more third parties.

The invention also provides for computer-implemented methods according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of optimizing throughput and quality of service of a presence-enabled managed service, the method comprising:

in response to a request from a requestor, via an aggregator of presence services, for presence information of a presentity:

looking up a subscriber profile of the aggregator associated with at least one of the requestor and the presentity that is stored in a cache of a presence server, the subscriber profile comprising a profile threshold time indicating a maximum amount of time that presence information for the presentity may remain in the cache, a profile query rate indicating a maximum query rate of presence requests that the aggregator may send to the presence server to request for the presence information of the presentity, and a profile trigger value indicating a predetermined time elapsed since a last presence request of the presence information of the presentity when the presence information is automatically updated;

fetching the presence information from the presentity and storing the presence information on a presence document on the cache with a timestamp and returning the stored presence information to the requestor if the presence information is not stored in the cache;

if the presence information is stored in the cache:

updating the stored presence information in the cache and returning the updated stored presence information from the cache to the requestor if a first time elapsed since the timestamp exceeds the profile threshold time;

returning the stored presence information to the requestor from the cache and then updating the stored presence information if the first time elapsed since the timestamp does not exceed the profile threshold time and a query rate of the requestor for the presence information exceeds the profile query rate and a second time elapsed since the last presence request of the presence information does not exceed the profile trigger value; and returning the stored presence information from the cache to the requestor and without updating the stored presence information in the cache if the first time elapsed since the timestamp does not exceed the profile threshold time and either of the query rate of the requestor for the presence information does not exceed the profile query rate or the second time elapsed since the last presence request of the presence information exceeds the profile trigger value.

2. The method of claim 1, further comprising:
selecting the profile threshold time, the profile query rate and the profile trigger value from high level service values, medium level service values, or low level service values in response to a level of service of the subscriber profile.

3. The method of claim 2, further comprising:
evaluating the presence information to determine whether the presence information is a representational state transfer-based resource document;
if the presence information is not the representational state transfer-based resource document, returning the presence information in response to the request from the requestor; and
if the presence information is the representational state transfer-based resource document, returning a subset of portions of the representational state transfer-based resource document that have changed in response to the request.

4. The method of claim 3, further comprising returning the representational state transfer-based resource document to the requestor if the presence information is the representational state transfer-based resource document and if the whole representational state transfer-based resource document is required to return the presence information.

5. The method of claim 2, further comprising periodically pruning the presence information in the cache that remains in the cache longer than a predetermined maximum allowable time interval corresponding to the profile threshold time value of the high level service.

6. A method of deploying an application enabling optimizing throughput and quality of service of a presence enabled managed service, comprising:

providing a computational device infrastructure that in response to a request from a requestor, via an aggregator of presence services, for presence information of a presentity:

looks up a subscriber profile of the aggregator associated with at least one of the requestor and the presentity that is stored in a cache of a presence server, the subscriber profile comprising a profile threshold time indicating a maximum amount of time that presence information for the presentity may remain in the cache, a profile query rate indicating a maximum query rate of presence requests that the aggregator may send to the presence server to request for the presence information of the presentity, and a profile trigger value indicating a predetermined time elapsed since a last presence request of the presence information of the presentity when the presence information is automatically updated;

fetches presence information from the presentity and stores the presence information on a presence document on the cache with a timestamp and returns the stored presence information to the requestor if the presence information is not stored in the cache;

if the presence information is stored in the cache:

updates the stored presence information in the cache and returns the updated stored presence information to the requestor from the cache if a first time elapsed since the timestamp exceeds the profile threshold time;

returns the stored presence information to the requestor from the cache and then updates the stored presence information if the first time elapsed since the timestamp does not exceed the profile threshold time and a query rate of the requestor for the presence information exceeds the profile query rate and a second time elapsed since the last presence request of the presence information does not exceed the profile trigger value; and returns the stored presence information from the cache to the requestor and without updating the stored presence information in the cache if the first time elapsed since the timestamp does not exceed the profile threshold time and either of the query rate of the requestor for the presence information does not exceed the profile query rate or the second time elapsed since the last presence request of the presence information exceeds the profile trigger value.

7. The method of claim 6, wherein the profile threshold time, the profile query rate and the profile trigger value are selected from high level service values, medium level service values, or low level service values in response to a level of service of the subscriber profile.

8. The method of claim 7, wherein the computational device infrastructure further:
  evaluates the presence information to determine whether the presence information is a representational state transfer-based resource document;
  if the presence information is not the representational state transfer-based resource document, returns the presence information in response to the request from the requestor; and
  if the presence information is the representational state transfer-based resource document, returns a subset of portions of the representational state-transfer-based resource document that have changed in response to the request.

9. The method of claim 8, wherein the computational device infrastructure further:
  returns the representational state transfer-based resource document to the requestor if the presence information is the representational state transfer-based resource document and if the whole representational state transfer-based resource document is required to return the presence information.

10. The method of claim 7, wherein the computational device infrastructure further:
  periodically prunes the presence information in the cache that remains in the cache longer than a predetermined maximum allowable time interval corresponding to the profile threshold time value of the high level service.

11. A computer program product, comprising:
  a computer-readable memory; and
  information comprising computer executable program code stored on the computer-readable memory, wherein the program code when deployed and executed on a computer system causes the computer system to, in response to a request from a requestor, via an aggregator of presence services, for presence information of a presentity:
    look up a subscriber profile of the aggregator associated with at least one of the requestor and the presentity that is stored in a cache of a presence server, the subscriber profile comprising a profile threshold time indicating a maximum amount of time that presence information for the presentity may remain in the cache, a profile query rate indicating a maximum query rate of presence requests that the aggregator may send to the presence server to request for the presence information of the presentity, and a profile trigger value indicating a predetermined time elapsed since a last presence request of the presence information of the presentity when the presence information is automatically updated;
    fetch presence information from the presentity and store the presence information on a presence document on the cache with a timestamp and return the stored presence information to the requestor if the presence information is not stored in the cache;
    if the presence information is stored in the cache:
      update the stored presence information in the cache and return the updated stored presence information to the requestor from the cache if a first time elapsed since the timestamp exceeds the profile threshold time;
      return the stored presence information to the requestor from the cache and then update the stored presence information if the first time elapsed since the timestamp does not exceed the profile threshold time and a query rate of the requestor for the presence information exceeds the profile query rate and a second time elapsed since the last presence request of the presence information does not exceed the profile trigger value; and
      return the stored presence information from the cache to the requestor and without updating the stored presence information in the cache if the first time elapsed since the timestamp does not exceed the profile threshold time and either of the query rate of the requestor for the presence information does not exceed the profile query rate or the second time elapsed since the last presence request of the presence information exceeds the profile trigger value.

12. The computer program product of claim 11, wherein the profile threshold time, the profile query rate and the profile trigger value are selected from high level service values, medium level service values, or low level service values in response to a level of service of the subscriber profile.

13. The computer program product of claim 12, wherein the program code when deployed and executed further causes the computer system to:
  evaluate the presence information to determine whether the presence information is a representational state transfer-based resource document;
  if the presence information is not the representational state transfer-based resource document, return the presence information in response to the request from the requestor; and
  if the presence information is the representational state transfer-based resource document, return a subset of portions of the representational state transfer-based resource document that have changed in response to the request.

14. The computer program product of claim 13, wherein the program code when deployed and executed further causes the computer system to:
  return the representational state transfer-based resource document to the requestor if the presence information is the representational state transfer-based resource document and if the whole representational state transfer-based document is required to return the presence information.

15. The computer program product of claim 12, wherein the program code when deployed and executed further causes the computer system to:
  periodically prune the presence information in the cache that remains in the cache longer than a predetermined maximum allowable time interval corresponding to the profile threshold time value of the high level service.

16. A system, comprising:
a processing unit;
a computer-readable memory in communication with the processing unit, the computer-readable memory storing computer codes; and
a network interface in communication with the processing unit and the memory;
wherein the processing unit, when executing the computer codes stored on the computer-readable memory:
parses a request from a requestor, to an aggregator of presence services, for presence information of a presentity;
looks up a subscriber profile of the aggregator associated with at least one of the requestor and the presentity that is stored in a cache of a presence server, the subscriber profile comprising a profile threshold time indicating a maximum amount of time that presence information for the presentity may remain in the cache, a profile query rate indicating a maximum query rate of presence requests that the aggregator may send to the presence server to request for the presence information of the presentity, and a profile trigger value for indicating a predetermined time elapsed since a last presence request of the presence information of the presentity when the presence information is automatically updated;
fetches presence information from the presentity and stores the presence information on a presence document on the cache with a timestamp and returning the stored presence information to the requestor if the presence information is not stored in the cache;
if the presence information is stored in the cache:
  updates the stored presence information in the cache and returns the updated stored presence information to the requestor from the cache if a first time elapsed since the timestamp exceeds the profile threshold time;
  returns the stored presence information to the requestor from the cache and then updates the stored presence information if the first time elapsed since the timestamp does not exceed the profile threshold time and a query rate of the requestor for the presence information exceeds the profile query rate and a second time elapsed since the last presence request of the presence information does not exceed the profile trigger value; and
  returns the stored presence information to the requestor from the cache and without updating the stored presence information in the cache if the first time elapsed since the timestamp does not exceed the profile threshold time and either of the query rate of the requestor for the presence information does not exceed the profile query rate or the second time elapsed since the last presence request of the presence information exceeds the profile trigger value.

17. The system of claim 16, wherein the profile threshold time, the profile query rate and the profile trigger value are selected from high level service values, medium level service values, or low level service values in response to a level of service of the subscriber profile.

18. The system of claim 17, wherein the processing unit when executing the computer codes stored on the computer-readable memory further:
  evaluates the presence information to determine whether the presence information is a representational state transfer-based resource document;
  if the presence information is not the representational state transfer-based resource document, returns the presence information in response to the request from the requestor; and
  if the presence information is the representational state transfer-based resource document, returns a subset of portions of the representational state transfer-based resource document that have changed in response to the request.

19. The system of claim 18, wherein the processing unit when executing the computer codes stored on the computer-readable memory further:
  returns the representational state transfer based resource document to the requestor if the presence information is the representational state transfer-based resource document and if the whole representational state transfer-based resource document is required to return the presence information.

20. The system of claim 17, wherein the processing unit when executing the computer codes stored on the computer-readable memory further:
  periodically prunes the presence information in the cache that remains in the cache longer than a predetermined maximum allowable time interval corresponding to the profile threshold time value of the high level service.

* * * * *